United States Patent [19] [11] 3,932,254
Comte [45] Jan. 13, 1976

[54] APPARATUS FOR SEMI-CONTINUOUS PRODUCTION OF LENGTHY HELICAL WAVE GUIDES
[75] Inventor: Georges N. Comte, Saint-leu-la-Foret, France
[73] Assignee: Cables de Lyon Alsacienne, Lyon, France
[22] Filed: Dec. 12, 1972
[21] Appl. No.: 314,478

Related U.S. Application Data
[63] Continuation-in-part of Ser. No. 875,685, Nov. 12, 1969, abandoned.

[30] Foreign Application Priority Data
Nov. 15, 1968 France............................ 68.174027
July 24, 1969 France............................ 69.25333
July 25, 1969 France............................ 69.25588

[52] U.S. Cl. ............... 156/361; 156/429; 156/431; 242/7.08
[51] Int. Cl.² .................. B65H 81/00; B65H 81/08
[58] Field of Search ........... 156/173, 184, 191, 195, 156/361, 429–432; 242/7.08, 7.21, 7.23, 156/7.15; 93/80; 138/131, 134, 139

[56] References Cited
UNITED STATES PATENTS

| 2,995,175 | 8/1961 | Lundskow | 156/429 |
| 3,144,072 | 8/1964 | Karbowiak | 156/173 |
| 3,179,347 | 4/1965 | Drees et al. | 242/7.15 |
| 3,230,123 | 1/1966 | Christensen | 242/7.22 |
| 3,332,815 | 7/1967 | Havens | 156/429 |
| 3,519,520 | 7/1970 | Newman, Jr. | 156/173 |
| 3,556,905 | 1/1971 | Wesch et al. | 156/173 |
| 3,614,005 | 10/1971 | Chartier | 156/173 |
| 3,616,000 | 10/1971 | Butzow et al. | 156/173 |
| 3,763,001 | 5/1968 | Withers | 156/173 |
| R25,820 | 7/1965 | Macchione | 93/80 |

OTHER PUBLICATIONS
Perry, et al. (Eds.), Perry's Chemical Engineering Handbook, New York; McGraw Hill, Inc., (1963), pp. 25-10, 25-11.

Primary Examiner—Douglas J. Drummond
Assistant Examiner—Basil J. Lewris
Attorney, Agent, or Firm—Sughrue, Rothwell, Mion, Zinn & Macpeak

[57] ABSTRACT
The semi-continuous manufacturing of wave-guides of great length formed by an insulated wire wound in a helicoidal way with its turns contacting one another, involves forming a first length of the guide on a cylindrical mandrel with the mandrel and the length being pushed longitudinally over a distance virtually equal to the length of the latter, the length is stopped in this position, and the mandrel is brought back to its original position to enable a new length of guide to be formed on it, and so on.

6 Claims, 9 Drawing Figures

APPARATUS FOR SEMI-CONTINUOUS PRODUCTION OF LENGTHY HELICAL WAVE GUIDES

CROSS-REFERENCE TO RELATED APPLICATIONS

This is a continuation-in-part application of co-pending application Ser. No. 875,685, filed Nov. 12, 1969, entitled Apparatus For Semi-Continuous Production of Lengthy Helical Wave Guides. That application was abandoned on the filing of this one.

BACKGROUND OF THE INVENTION

1. Field of the Invention

The invention concerns the production of helical wave-guides by winding an insulated conductor on a cylindrical mandrel.

2. Description of the Prior Art

In order to continuously produce wave-guides of considerable length, despite the limited length of the mandrel, it has already been proposed to use a method wherein a section of guide is formed on the mandrel and then the section is slid on the mandrel which itself is left fixed, to remove it from the latter and thus free the mandrel to permit forming a second section on it without any discontinuity with the first section, and so forth. Machines have also been described for using this method.

SUMMARY OF THE INVENTION

The invention provides a further method and machine for producing such guides of considerable length, characterized in that, after having formed a first guide section on the mandrel, the assembly constituted by mandrel and section is pushed longitudinally over a distance substantially equal to the length of the section, and the section is immobilized in this position and the mandrel is returned to its initial position to permit forming a new section on it, and so forth.

DESCRIPTION OF THE PREFERRED EMBODIMENTS

Figure 1:
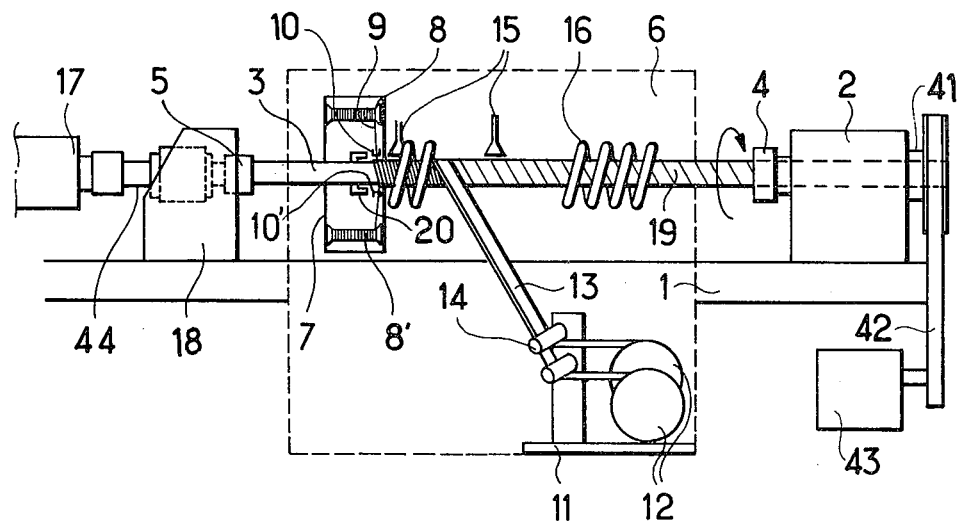
FIG. 1 is a side view of one possible embodiment of the invention.

In FIG. 1, a frame 1 of a machine connected to a lathe has, on its upstream end, a rigid headstock 2 provided with a spindle 41 and, on its downstream end, a mobile headstock 18 provided with a tailstock 5. A cylindrical mandrel 3 is disposed between a coupling member 4 at its upstream end and the tailstock 5 at its downstream end. The member 4 is a conventional clamping and centering jaw plate supported by the spindle 41. The spindle 41 is driven in rotation by means of a belt 42 driven by a motor 43. The mandrel itself is driven in rotation by the spindle 41 and the coupling member 4.

A winding assembly supported by a sliding carriage and designated by the reference numeral 6 is disposed along the frame and driven in translation by the motor 43 by means of conventional means such as a screw (not shown).

The winding assembly 6 comprises a rotary winding means 7 and a tape distributor 11.

Figure 3:
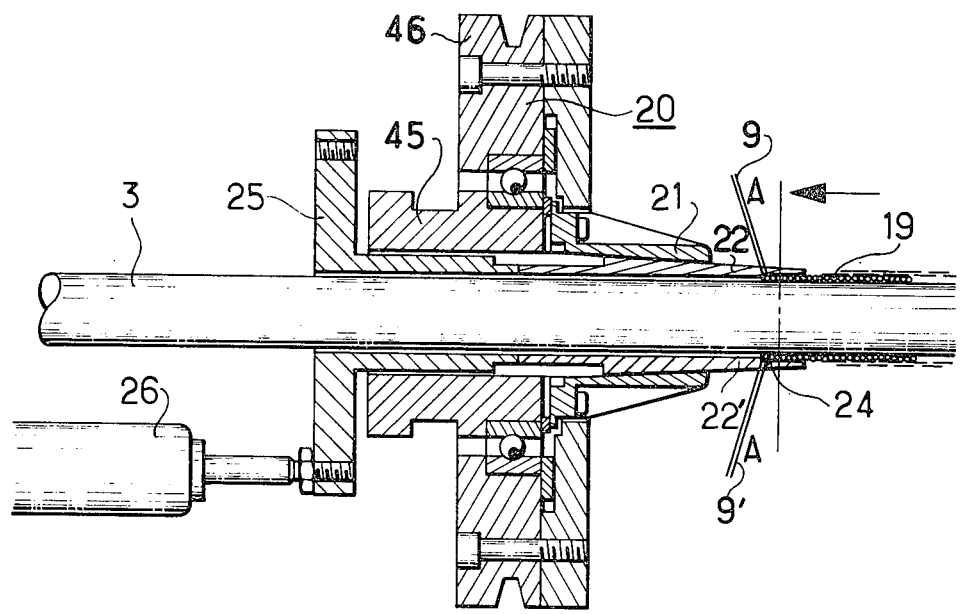
FIGS. 3–7 represent various particular features of the embodiment of FIG. 1.
Figure 4:
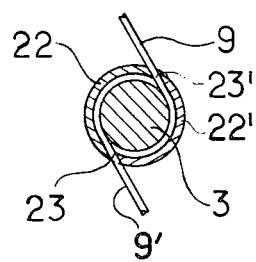
Figure 5:
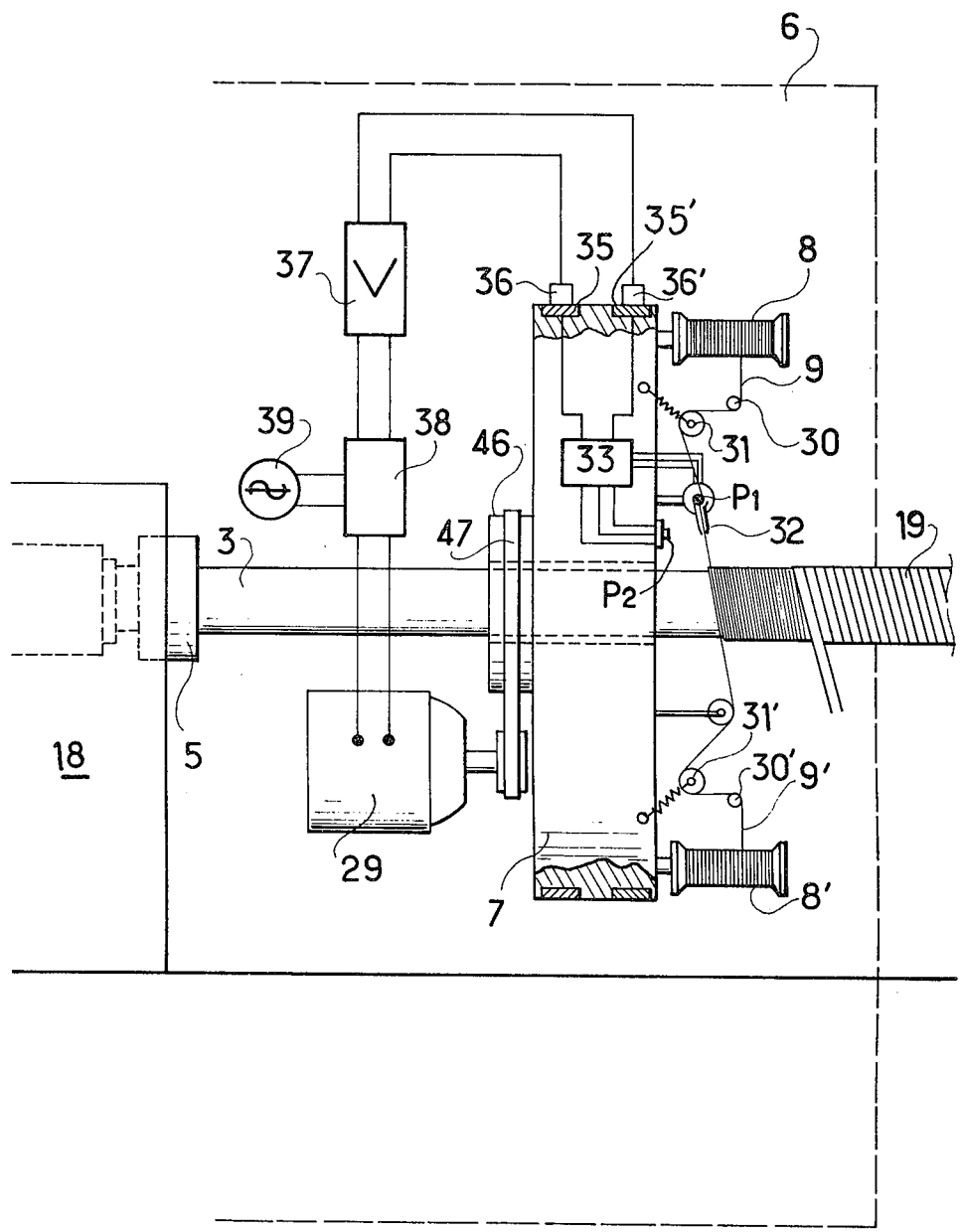
Figure 6:
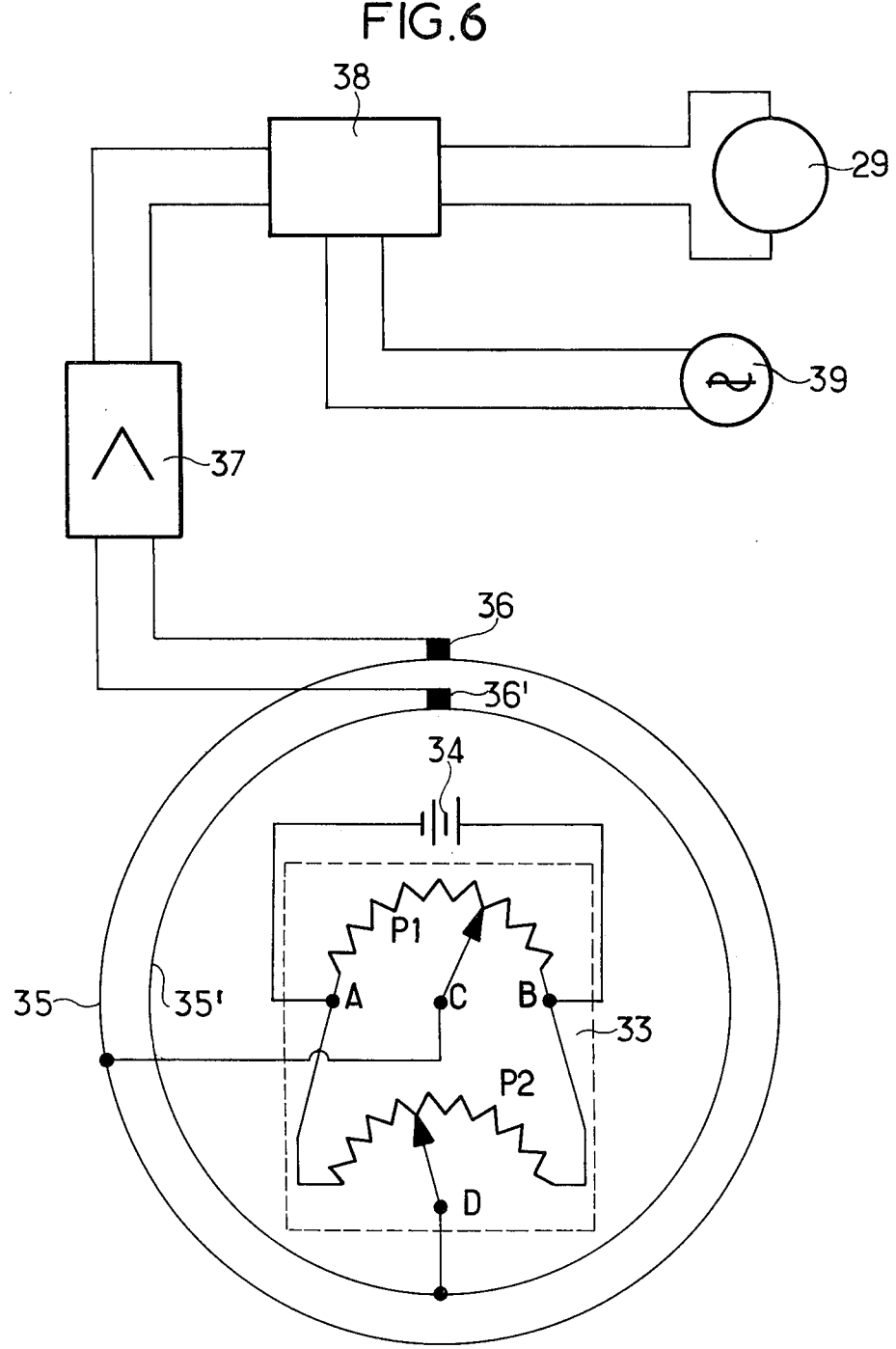

The means 7 comprises one or more reels 8 and 8' carrying wire 9 and 9' which is to constitute the internal wall of the guide, one or more wire guides 10 and 10', a blocking device assembly 20 (the details of which are indicated in FIGS. 3 and 4), and a device for automatically correcting the variations in inclination as the wire is wound on the mandrel (details of this device are indicated in FIGS. 5 and 6). The rotary winding means 7 is driven in rotation by a motor 29 represented in FIGS. 5 and 6. The tape distributor 11 bears one or more reels 12 carrying insulating tapes or conductor tapes such as 13 guided by rollers 14 which also permit regulation of the tension of the tapes.

The winding assembly 6 also comprises at least one pipe such as 15 through which a synthetic bonding material is projected onto the guide as it is being formed. The assembly also comprises heating means for bringing about the polymerization of the synthetic material. These heating means may, for example, be windings such as 16 through which passes a high frequency electric current. The synthetic bonding material may be advantageously a mixture of polyester or epoxy resin and a hardener having a rapid action.

The shaft 44 of a jack 17 is also connected to the mobile headstock 18 at the opposite side to the tailstock 5.

The operation of the machine will now be explained.

Figure 2A:
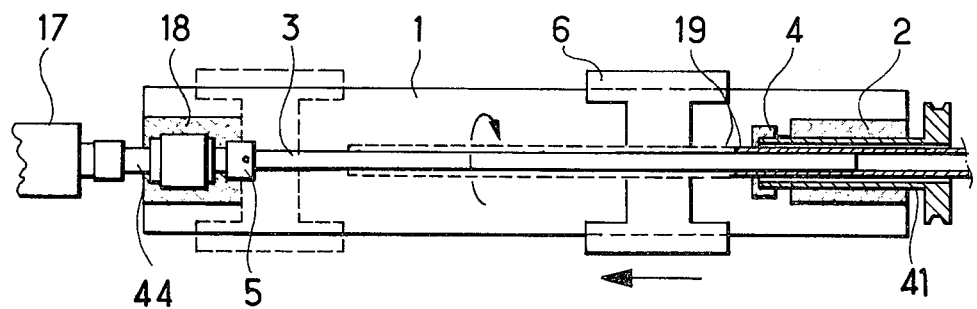
FIGS. 2a, 2b and 2c are top views showing the embodiment of FIG. 1 in various stages of operation.
Figure 2:
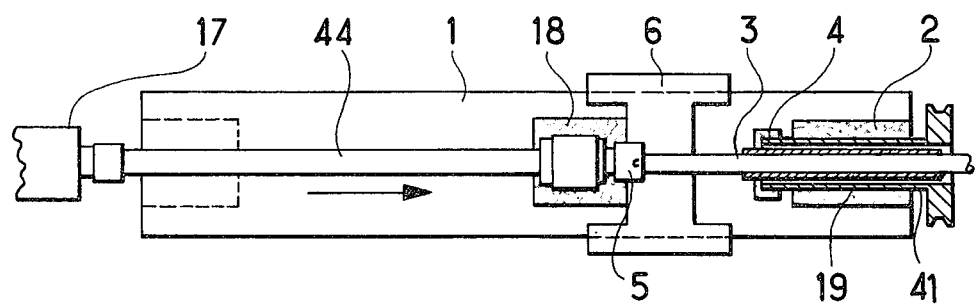
Figure 2:
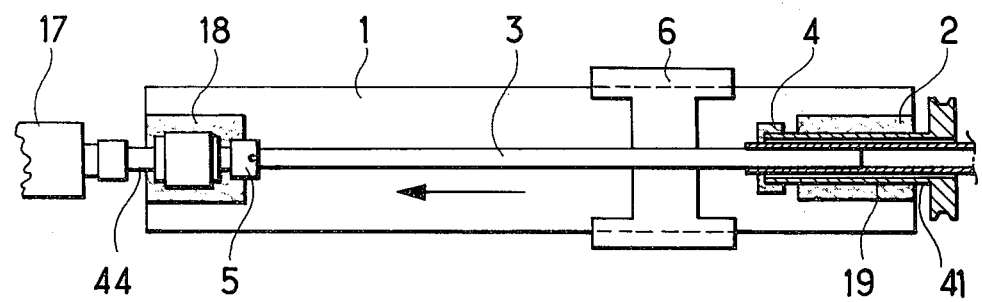

The first stage is the winding stage which is shown in FIG. 2a. As the coupling means 4 is clamped on the upstream end of the mandrel 3, the winding assembly 6 is driven in translation along the the mandrel 3 substantially from its upstream end to its downstream end by any suitable means (not shown), such as the previously mentioned screw. The combination of the translational movements of the winding assembly 6 and the rotation of the winding means 7 ensures that the wire 9 and 9' is wound helically on the mandrel 3. The combination of the translational movement of the winding assembly 6 and the rotation of the mandrel 3 ensures the helicoidal winding of the tapes 13. The winding assembly is impregnated with the synthetic material projected through the pipes 15. The material is then heated by the windings 16, resulting in its polymerization and solidification. A wave-guide section 19 is thus produced. The winding assembly 6 and the wave-guide section 19 are shown in solid lines in their upstream position and in phantom lines in their downstream position.

The second stage is shown in FIG. 2b. The shaft 44 of the jack 17 is pushed upstream, carrying with it the assembly consisting of the mobile headstock 18, the winding assembly 6, the mandrel 3, and the wave-guide section 19 so that the winding assembly arrives in front of the coupling means 4. The mobile headstock 18 is shown in phantom in its downstream position and in solid lines in its upstream position. The coupling means 4 is then loosened, for example, manually, and the wave-guide section 19 is inserted into the spindle 41, which is hollow.

According to a variant, at least the winding assembly 6 may be returned upstream by the motor 43.

The third stage is shown in FIG. 2c. The mobile headstock 18 and the mandrel 3 are returned to their initial position by the shaft 44 of the jack 17. The machine is then available for forming a new wave-guide section after tightening of the coupling means 4.

To effect the return movement of the mandrel while leaving the wave-guide section in place, the section has to be blocked by means of a blocking device such as the one described in FIGS. 3 and 4, while the coupling means 4 is kept in a release state.

The blocking device may consist adavntageously of jaw grippers controlled for example by an auxiliary hydraulic jack. It may also be controlled manually.

The reference numeral 20 designates a blocking device assembly. This assembly is shown in FIG. 3. It includes a hub 45 integral with the winding assembly 6. A disc 46 supporting the rotary winding means 7 as shown in FIG. 5 and acting as a pulley for the same is attached to the hub 45 by way of a ball bearing. This pulley is driven by means of the belt 47 and the motor 29, which is supported by the winding assembly 6 as shown in FIG. 5.

The hub 45 carries a hollow cylindrical part 21 in which are engaged clamping jaws 22 and 22' having a frusto-conical outer profile. These jaws cooperate after the fashion of a mandrel with the hollow internal profile of the part 21. The internal profile of the part 21 is also frusto-conical but in the reverse direction. The wound wire 9 and 9' pass through the gaps 23 and 23' between clamping jaws 22 and 22', as shown in FIG. 4. The front ends of these jaws 22 and 22' may be moved upstream by means of a maneuvering plate 25 activated by the piston of an auxiliary jack 26. The auxiliary jack may advantageously be integral with the plate 25 and be supported by the winding assembly 6.

The blocking device operates in the manner described hereafter. When the mandrel 3 supporting the wave-guide section 19 has been brought by the shaft 44 of the jack 17 into the position of the second stage as shown in FIG. 2b, the auxiliary jack 26 is caused to move forward either by an end of stroke contact or manually. The plate 25 then pushes the jaws 22 and 22' which slide against the inner surface of the hollow cylindrical part 21, which is fixed relative to the plate 25.

The jaws 22 and 22' pass exteriorly of the wave-guide section 19 until the shoulder 24 is situated at the downstream end of the wave-guide section 19, which abuts against the shoulder during the withdrawal of the mandrel. The wave-guide section is thus blocked by the shoulder and prevented from following the mandrel in its return movement.

When the mandrel 3 has completed its return movement, the auxiliary jack 26 is operated in the opposite direction, which makes the plate 25 withdraw and permits the jaws 22 and 22' to move apart, for example under the action of an elastic element (not shown), thus releasing the downstream end of the wave-guide section 19 in preparation for a new section.

Other clamping means could also be used such as clamping shoes adapted to be controlled in the manner of a lathe face plate.

The machine according to the invention may advantageously comprise a device for obviating the various irregularities which may occur in the winding of the wire owing to, for example, variations in the diameter of the wire or variations in the rotational speed of the mandrel and/or winding means. Owing to these irregularities, there is a risk that the neighboring turns of the wire may not be contiguous, or even may overlap one another.

The device provided for this purpose, used with a machine having a rotary housing, makes the rate of rotation of the housing and thus the ratio of the speeds of rotational movement of the mandrel and the housing vary so that the winding pitch of the wire remains constant despite the aforesaid irregularities.

This device comprises means for arranging that the speed of the driving motor for the rotational movement of the mandrel or that of the housing is controlled by the winding angle of the wire relatively to the axis of the mandrel.

A preferred embodiment of a device of this kind is shown by way of example in FIGS. 5 and 6.

FIG. 5 is a diagrammatic view of a part of the machine comprising this device, and FIG. 6 shows an electrical connection diagram of said device.

The machine illustrated comprises a mandrel 3 driven in rotation by a motor (not shown) and about which rotates the rotary winding means 7 driven by a motor 29. This rotary winding means bears the two reels 8, 8' from which conductor wires 9, 9' unwind, guided by the feed rolls 30 and 30' and the tension rolls 31, 31'.

Immediately before it is wound on the mandrel 3, the wire 9 passes into a hollow needle 32. One end of needle 32 is mounted on the shaft of a potentiometer $P_1$ carried by the rotary winding means 7. This rotary winding means also bears a second potentiometer $P_2$ with manual control.

These two potentiometers are connected so as to constitute a Wheatstone bridge 33 as shown in more detail in FIG. 6. The resistance of the potentiometer $P_1$ constitutes two adjacent arms of this bridge, and that of potentiometer $P_2$ the two other arms. The apexes A and B of the bridge, constituted by the ends of these resistances, are connected to a direct current source 34 (not shown in FIG. 5), and the apexes C and D, constituted by the mobile contacts of the two potentiometers, are connected respectively to rings 35, 35' disposed on the rotary winding means 7.

On these rings there bear brushes 36, 36', which are connected by means of a differential amplifier 37 to the control circuit of a conventional change-speed device 38, inserted between an alternating current source 39 and the motor 29.

This device operates as follows:

When the machine is stopped, the potentiometer $P_2$ is regulated so that, when the hollow needle has the desired inclination, the bridge is in equilibrium and therefore does not send any voltage to the control circuit of the change speed device 38.

If subsequently, when the machine is in operation, the needle 32 for any reason moves away in one direction or the other from the desired angle, the bridge is no longer in equilibrium and a voltage of one or the other polarity is applied to the change-speed device 38. This causes acceleration or deceleration of the motor 29, with the result that the angle of the wire relatively to the mandrel, and consequently the inclination of the needle 32, is returned to the correct value, and the bridge is once more returned to a state of equilibrium.

It is obvious that the amplifier 37 is capable of acting in a similar manner on a change-speed device of the driving motor for the mandrel or carriage effecting the translational movements.

An improvement has been made on the machine with regard to the means for heating the plastic material to be polymerized. This improvement consists in replacing the high frequency heating means surrounding the mandrel by heating means incorporated in the mandrel.

Figure 7:
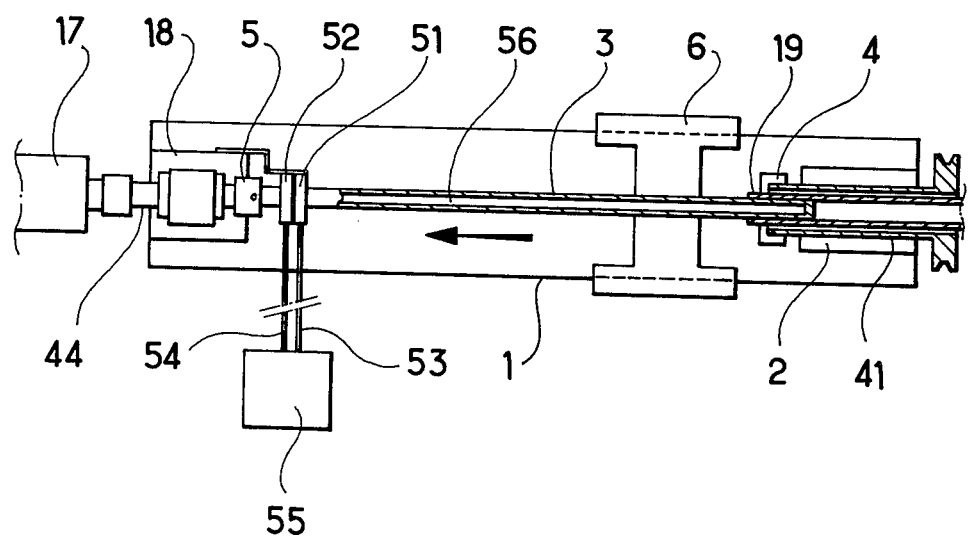

Accordingly, FIG. 7 shows the mandrel 3 which comprises an inner chamber 56 with an outlet at its downstream end where it is provided in a known manner with two collars 51 and 52 having rotary joints supported by the mobile headstock 18 and disposed between the headstock 18 and the tailstock 5. These collars are connected by means of an inflow channel 53 and an outflow channel 54 to the fluid source 55 comprising means for regulating the temperature of the fluid which may be hot or cold. The fluid may advantageously be water.

During the winding stage, the source 55 injects hot water having a temperature of 80°C into the chamber 56 of the mandrel 3 by means of the channel 53 and the collar 51. The hot water permits the polymerization of the synthetic material. The hot water, slightly cooled, returns to the source by way of the collar 52 and the channel 54. Before the withdrawal of the mandrel, the source 55 injects cold water having a temperature of ca. 40°C, in place of the hot water. In this way the diameter of the mandrel is slightly reduced which greatly facilitates the return of the mandrel to its initial position.

What is claimed is:

1. A machine for the semi-continuous manufacture of wave-guides of considerable length from a plurality of sections of wave-guides of a standard length, said machine comprising:
   a. a cylindrical mandrel;
   b. first means for rotating said cylindrical mandrel during the manufacture of each section of wave-guide;
   c. a carriage movable relative to said cylindrical mandrel in the direction parallel to the axis thereof;
   d. second means for displacing said carriage from a first end of said cylindrical mandrel to the second end thereof during the manufacture of each section of wave-guide in synchronism with the rotational movement of the latter;
   e. third means for displacing said carriage from the second end of said cylindrical mandrel to the first end thereof in between the manufacture of each section of wave-guide;
   f. fourth means for winding wire on said cylindrical mandrel, said fourth means being movable with said carriage and being mounted for rotation about said cylindrical mandrel;
   g. fifth means for causing said fourth means to rotate about said cylindrical mandrel, whereby the wire is wound on said cylindrical mandrel in a helical fashion while said carriage is being displaced by said second means;
   h. sixth means for continuously controlling the ratio of the rotational speeds of said first and fifth means during operation of the machine in response to the angle at which wire is wound on said cylindrical mandrel such that the winding angle relative to the axis of said cylindrical mandrel remains constant, thereby maintaining a constant winding pitch of the wire so as to obtain contiguous turns;
   i. seventh means for distributing tape on the wire wound on said cylindrical mandrel, said seventh means being mounted on and movable with said carriage, whereby the combination of the translational motion of said carriage and the rotational motion of said mandrel causes the tape to be wound on the wire in a helical fashion;
   j. eighth means for displacing said cylindrical mandrel and a section of wave-guide manufactured on said cylindrical mandrel (i) parallel to the axis of said cylindrical mandrel, (ii) in the direction of the first end of said cylindrical mandrel, and (iii) by an amount equal to the standard length of a section of wave-guide, thereby moving said cylindrical mandrel and a section of wave-guide manufactured on said cylindrical mandrel from a first position to a second position;
   k. ninth means for gripping and immobilizing a section of wave-guide manufactured on said cylindrical mandrel after said cylindrical mandrel and the section of wave-guide are in the second position; and
   l. 10th means for displacing said cylindrical mandrel from its second position to its first position by a motion which is (i) parallel to the axis of said cylindrical mandrel, (ii) in the direction of the second end of said cylindrical mandrel, and (iii) equal in length to the standard length of a section of wave-guide while said ninth means remains actuated, whereby said cylindrical mandrel is withdrawn from the section of wave-guide and is returned to its first position while the section of wave-guide remains in its second position.

2. A machine as claimed in claim 1 wherein said ninth means comprises:
   a. jaw grippers and
   b. means for clamping said jaw grippers on a section of wave-guide while said cylindrical mandrel and the section of wave-guide are in the second position.

3. A machine as claimed in claim 1 wherein said third, eighth, and tenth means comprise a single jack, the shaft of which is secured to the second end of said cylindrical mandrel.

4. A machine as claimed in claim 1 wherein said sixth means comprises a hollow needle through which the wire passes immediately before it is wound onto said cylindrical mandrel.

5. A machine as claimed in claim 4 wherein said sixth means further comprise:
   a. a Wheatstone bridge, the arms of which comprise two potentiometers, one for use in calibration and the other having said hollow needle mounted thereon, and
   b. eleventh means responsive to the output of said Wheatstone bridge for changing the winding speed of said fifth means.

6. A machine as claimed in claim 5 wherein said Wheatstone bridge is mounted on said fourth means and further comprising:
   a. two conductor rings mounted on said fourth means, said conductor rings being connected respectively to the two outputs of said Wheatstone bridge;
   b. two brushes mounted on said carriage and disposed for wiping contact with said conductor rings; and
   c. a differential amplifier which connects said brushes to a control circuit for said 11th means.

* * * * *